United States Patent
Kaladgi et al.

(10) Patent No.: US 10,360,558 B2
(45) Date of Patent: Jul. 23, 2019

(54) SIMPLIFIED TWO FACTOR AUTHENTICATION FOR MOBILE PAYMENTS

(71) Applicant: CA, Inc., New York, NY (US)

(72) Inventors: Mohammed Mujeeb Kaladgi, Bangalore (IN); Mahesh Malatesh Chitragar, Bangalore (IN); Vishwanatha Salian, Bangalore (IN)

(73) Assignee: CA, Inc., New York, NY (US)

( * ) Notice: Subject to any disclaimer, the term of this patent is extended or adjusted under 35 U.S.C. 154(b) by 737 days.

(21) Appl. No.: 14/660,240

(22) Filed: Mar. 17, 2015

(65) Prior Publication Data

US 2016/0275491 A1 Sep. 22, 2016

(51) Int. Cl.
| | |
|---|---|
| *G06Q 20/36* | (2012.01) |
| *H04L 29/06* | (2006.01) |
| *G06Q 20/38* | (2012.01) |
| *G06Q 20/40* | (2012.01) |
| *G06Q 20/32* | (2012.01) |
| *H04W 12/06* | (2009.01) |
| *G06F 21/31* | (2013.01) |

(52) U.S. Cl.
CPC ......... *G06Q 20/3674* (2013.01); *G06F 21/31* (2013.01); *G06Q 20/322* (2013.01); *G06Q 20/325* (2013.01); *G06Q 20/367* (2013.01); *G06Q 20/3672* (2013.01); *G06Q 20/3829* (2013.01); *G06Q 20/4012* (2013.01); *H04L 63/0428* (2013.01); *H04L 63/083* (2013.01); *H04L 63/0838* (2013.01); *H04L 63/0853* (2013.01); *H04W 12/06* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,937,066 | A * | 8/1999 | Gennaro | H04L 9/0841 380/286 |
| 7,472,829 | B2 * | 1/2009 | Brown | G06K 19/06206 235/380 |
| 7,707,113 | B1 * | 4/2010 | DiMartino | G06Q 20/105 705/41 |

(Continued)

OTHER PUBLICATIONS

Ferdous et al (Portable Personal Identity Provider in Mobile Phones) (Year: 2013).*

(Continued)

*Primary Examiner* — Mamon Obeid
(74) *Attorney, Agent, or Firm* — Baker Botts L.L.P.

(57) ABSTRACT

A method for two factor authentication is described. The method comprises sending an activation code stored on a mobile device to a server for verification. An encrypted secret key generated by the server using the activation code is received. The secret key is decrypted using the activation code stored on the mobile device. The mobile device encrypts the secret key using a predetermined PIN. As a result of a user inputting the predetermined PIN, the secret key is decrypted, the mobile device generates a first token using the secret key and transmits the first token to the server to authenticate the user. After receiving authentication from the server, the information on the mobile device is synced with the server.

20 Claims, 7 Drawing Sheets

(56) References Cited

U.S. PATENT DOCUMENTS

| | | | |
|---|---|---|---|
| 7,922,082 B2 | 4/2011 | Muscato | |
| 8,387,866 B2 | 3/2013 | Hammad et al. | |
| 8,655,310 B1 | 2/2014 | Katzer et al. | |
| 8,681,987 B2* | 3/2014 | Fairbanks | H04L 9/0863 380/270 |
| 9,231,947 B2* | 1/2016 | Fairbanks | H04L 9/0863 |
| 9,237,146 B1* | 1/2016 | Casillas | H04L 63/08 |
| 9,843,580 B2* | 12/2017 | Fairbanks | H04L 9/0863 |
| 10,050,942 B2* | 8/2018 | Kaladgi | H04L 63/0838 |
| 10,089,631 B2* | 10/2018 | Kumar | G06Q 20/407 |
| 2002/0144116 A1* | 10/2002 | Giobbi | G06F 21/10 713/168 |
| 2005/0171898 A1* | 8/2005 | Bishop | G06Q 20/00 705/39 |
| 2007/0078734 A1* | 4/2007 | Oren | G06Q 20/102 705/26.1 |
| 2007/0260544 A1* | 11/2007 | Wankmueller | G06Q 20/40 705/44 |
| 2007/0271149 A1* | 11/2007 | Siegel | G06Q 30/0603 705/26.41 |
| 2008/0148042 A1 | 6/2008 | Brown et al. | |
| 2008/0301057 A1* | 12/2008 | Oren | G06F 21/31 705/71 |
| 2008/0301461 A1* | 12/2008 | Coulier | G06F 21/31 713/184 |
| 2010/0100721 A1* | 4/2010 | Su | G06F 11/1456 713/150 |
| 2010/0150348 A1* | 6/2010 | Fairbanks | H04L 9/0863 380/255 |
| 2011/0093351 A1* | 4/2011 | Afana | G06Q 20/20 705/16 |
| 2011/0113245 A1 | 5/2011 | Varadarajan | |
| 2011/0184867 A1 | 7/2011 | Varadarajan | |
| 2011/0251892 A1* | 10/2011 | Laracey | G06Q 30/0253 705/14.51 |
| 2011/0258452 A1* | 10/2011 | Coulier | G06F 21/31 713/171 |
| 2011/0276417 A1* | 11/2011 | Campbell | G06Q 20/02 705/16 |
| 2012/0089519 A1* | 4/2012 | Peddada | G06Q 20/3829 705/71 |
| 2012/0109824 A1* | 5/2012 | Takatori | G06F 21/33 705/44 |
| 2012/0129492 A1 | 5/2012 | Mechaley, Jr. | |
| 2012/0151566 A1 | 6/2012 | Lin et al. | |
| 2012/0153028 A1 | 6/2012 | Poznansky et al. | |
| 2012/0191569 A1* | 7/2012 | Shah | G06Q 30/0613 705/26.41 |
| 2012/0231736 A1 | 9/2012 | Amiel et al. | |
| 2012/0289343 A1 | 11/2012 | Pokonosky | |
| 2012/0300927 A1* | 11/2012 | Choi | H04W 12/06 380/247 |
| 2013/0048714 A1* | 2/2013 | Sharma | G06Q 20/346 235/379 |
| 2013/0159195 A1 | 6/2013 | Kirillin et al. | |
| 2013/0254053 A1* | 9/2013 | Hayhow | G06Q 20/3829 705/21 |
| 2013/0262317 A1 | 10/2013 | Collinge et al. | |
| 2014/0067683 A1 | 3/2014 | Varadarajan | |
| 2014/0143108 A1* | 5/2014 | Smith | G06Q 20/3229 705/35 |
| 2014/0189359 A1* | 7/2014 | Marien | H04L 9/3228 713/172 |
| 2014/0250006 A1* | 9/2014 | Makhotin | G06Q 20/3227 705/41 |
| 2014/0337236 A1* | 11/2014 | Wong | G06Q 20/363 705/71 |
| 2014/0341379 A1* | 11/2014 | Fairbanks | H04L 9/0863 380/270 |
| 2014/0373117 A1* | 12/2014 | Le Saint | G06F 21/33 726/6 |
| 2015/0019425 A1* | 1/2015 | Kumar | G06Q 20/4016 705/44 |
| 2015/0073996 A1* | 3/2015 | Makhotin | G06Q 20/02 705/71 |
| 2015/0095227 A1* | 4/2015 | Brozek | G06Q 20/4016 705/44 |
| 2015/0178723 A1 | 6/2015 | Khan et al. | |
| 2015/0178724 A1 | 6/2015 | Ngo et al. | |
| 2015/0180836 A1 | 6/2015 | Wong et al. | |
| 2015/0193764 A1 | 7/2015 | Haggerty | |
| 2016/0036808 A1* | 2/2016 | Li | H04L 9/006 726/6 |
| 2016/0063476 A1 | 3/2016 | Baldie | |
| 2016/0085955 A1* | 3/2016 | Lerner | G06F 21/31 726/20 |
| 2016/0253669 A1* | 9/2016 | Yoon | G06Q 20/4014 705/75 |
| 2016/0253670 A1 | 9/2016 | Kim et al. | |
| 2016/0261591 A1* | 9/2016 | Fairbanks | H04L 9/0863 |
| 2016/0275491 A1* | 9/2016 | Kaladgi | H04L 63/0428 |
| 2016/0275513 A1* | 9/2016 | Kumar | G06Q 20/407 |
| 2016/0277263 A1* | 9/2016 | Kaladgi | H04L 63/0838 |
| 2017/0032362 A1* | 2/2017 | Lahkar | G06Q 20/3672 |
| 2017/0048210 A1* | 2/2017 | Jooste | H04L 63/08 |
| 2018/0026962 A1* | 1/2018 | Kaladgi | H04L 63/0807 713/159 |
| 2018/0109522 A1* | 4/2018 | Fairbanks | H04L 9/0863 |
| 2018/0189502 A1* | 7/2018 | Kumar | G06F 21/602 |
| 2018/0374079 A1* | 12/2018 | Hewitt | G06Q 20/341 |

OTHER PUBLICATIONS

Marwaha, "Apple Pay vs. Google Wallet: Lost and Stolen Scenario", Oct. 28, 2014, http://www.gmarwaha.com/blog/2014/10/28/apple-pay-vs-google-wallet-lost-and-stolen-scenario/.

US Patent & Trademark Office, Non-Final Rejection issued in U.S. Appl. No. 14/660,333, dated Mar. 21, 2016.

US Patent & Trademark Office, Non-Final Rejection issued in U.S. Appl. No. 14/661,894, dated Mar. 24, 2016.

US Patent & Trademark Office, Non-Final Rejection issued in U.S. Appl. No. 14/661,870, dated May 3, 2016.

US Patent & Trademark Office, Final Rejection issued in U.S. Appl. No. 14/660,333, dated Jul. 27, 2016.

US Patent & Trademark Office, Final Rejection issued in U.S. Appl. No. 14/661,894, dated Aug. 26, 2016.

US Patent & Trademark Office, Final Rejection issued in U.S. Appl. No. 14/661,870, dated Sep. 1, 2016.

US Patent & Trademark Office, Non-Final Rejection issued in U.S. Appl. No. 14/661,894, dated Dec. 20, 2016.

US Patent & Trademark Office, Non-Final Rejection issued in U.S. Appl. No. 14/661,870, dated Mar. 10, 2017.

US Patent & Trademark Office, Non-Final Rejection issued in U.S. Appl. No. 14/660,333, dated Apr. 27, 2017.

US Patent & Trademark Office, Final Rejection issued in U.S. Appl. No. 14/661,894, dated Jun. 29, 2017.

US Patent & Trademark Office, Final Rejection issued in U.S. Appl. No. 14/660,333, dated Aug. 31, 2017.

US Patent & Trademark Office, Final Rejection issued in U.S. Appl. No. 14/661,870, dated Sep. 15, 2017.

United States Patent and Trademark Office, Non-Final Office Action issued in U.S. Appl. No. 14/661,870, dated Mar. 1, 2018.

United States Patent and Trademark Office, Non-Final Office Action issued in U.S. Appl. No. 14/660,188, dated Dec. 22, 2017.

United States Patent and Trademark Office, Non-Final Office Action issued in U.S. Appl. No. 14/660,384, dated Dec. 22, 2017.

United States Patent and Trademark Office, Advisory Action issued in U.S. Appl. No. 14/661,870, dated Jan. 29, 2018.

United States Patent and Trademark Office, Notice of Allowance issued in U.S. Appl. No. 14/661,870, dated May 18, 2018.

United States Patent and Trademark Office, Corrected Notice of Allowability issued in U.S. Appl. No. 14/661,870, dated Jun. 13, 2018.

(56) References Cited

OTHER PUBLICATIONS

Harbitter et al., "The Performance of Public Key-Enabled Kerberos Authentication in Mobile Computing Applications," Proceedings of the 8th ACM Conf. on Computer and Communications Security, Nov. 5-8, 2001, ACM.
Lin et al., "A Secure One-Time Password Authentication Scheme with Low-Computation for Mobile Communications," ACM Sigops Operating Systems Review, vol. 38, Issue 2, Apr. 2014, pp. 76-84.
Shin et al., "Micro-Payment System Using OTP for Customer's Anonymous," IEEE Xplore, May 2011.
João Pedro Sousa "Challenges and Architectural Approaches for Authenticating Mobile Users," Proceedings SAM'08, pp. 15-20, ACM, May 10, 2008.
US Patent & Trademark Office, Notice of Allowance issued in U.S. Appl. No. 14/660,333, dated Apr. 17, 2018.
US Patent & Trademark Office, Corrected Notice of Allowability issued in U.S. Appl. No. 14/660,333, dated May 1, 2018.
US Patent & Trademark Office, Non-Final Office Action issued in U.S. Appl. No. 14/661,894, dated May 11, 2018.
United States Patent and Trademark Office, Non-Final Office Action issued in U.S. Appl. No. 14/661,894, dated Oct. 20, 2017.

* cited by examiner

SIMPLIFIED TWO FACTOR AUTHENTICATION FOR MOBILE PAYMENTS

TECHNICAL FIELD

The present disclosure relates to contactless transactions and, in particular, to an apparatus, computer-readable medium, and method for authentication in a mobile payment.

BACKGROUND

Credit cards have become an immensely popular method of payment for goods and services. As mobile devices have grown in popularity, consumers now desire the ability to complete transactions using mobile applications on mobile devices. Mobile phones can be used for making efficient payments via contactless transactions at a merchant terminal. To successfully complete a transaction, sensitive card data must be transferred to the mobile device. To do so, the server or network containing the data needs to authenticate the user of the mobile device.

There are several authentication options to sync operations between a mobile application on a mobile device and a server. Two-way authentication, for example, involves two parties authenticating each other at the same time. This method requires the mobile application to authenticate itself to the server and the server to authenticate itself to the mobile application, such that both are assured of the other's identity. This method is an inefficient solution to the problem.

Another authentication solution is two-way Secure Socket Layer (SSL) authentication. Two-way SSL authentication requires the mobile application to be provisioned with a SSL certificate. Given that there could be millions of users, provisioning a SSL certificate for each user is impractical.

An alternative authentication method requires the user to provide two passwords—one for sync operations and another for payment operations. However, a single factor authentication method requiring the user to remember two passwords is cumbersome.

Accordingly, there is a need in the marketplace for a system designed to provide two factor authentication to ensure a better user experience. Furthermore, from an efficiency, security, and cost standpoint, the current disclosure provides an effective solution to this problem by using one password to enable payment and sync authentication.

Embodiments of the present disclosure can address the above problems, and other problems, individually and collectively.

SUMMARY

According to an embodiment of the present disclosure, a method comprising sending an activation code stored on a mobile device to a server for verification, receiving an encrypted secret key generated by the server using the activation code, decrypting the secret key using the activation code stored on the mobile device, encrypting the secret key using a predetermined personal identification number (PIN), receiving the predetermined PIN from a user, in response to receiving the predetermined PIN: decrypting the secret key, generating via the mobile device a first token using the secret key, transmitting the first token to the server to authenticate the user, receiving authentication from the server, and syncing information on the mobile device with the server.

According to another embodiment of the present disclosure, a method comprising receiving, at a server, an activation code from a mobile device for verification, generating at the server a secret key using the activation code, encrypting the secret key, sending the encrypted secret key to the mobile device, receiving at the server a first token generated by the mobile device using the secret key for authentication, generating at the server a second token using the secret key, determining whether the first token is identical to the second token, and syncing information on the server with the mobile device.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-3B, like numerals being used for corresponding parts in the various drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to contactless transactions using a mobile device, systems and methods disclosed herein may also be related to contactless transactions utilizing credit cards, ticket scanning, transportation passes, and building access.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the last fifty years, credit cards have become an immensely popular method of payment for goods and services. This is due in large part to the advantages credit cards provide to both the cardholder and the merchant. For example, credit cards often have magnetic strips that can contain a variety of information such as a cardholder's identity and account information. In addition, for example, credit cards offer cardholders and merchants the convenience of not having to carry or maintain large amounts of cash. Cardholders are also able to defer payment of a credit balance and purchase goods/services online securely using encrypted information.

More recently, in view of the recent expansion in mobile phone technology, the ability to use mobile phones to make mobile payments for goods and services has been an area of particular interest. There are basically two ways of conducting contactless mobile payments today that do not involve any cards or the swiping of such cards: Near Field Communications (NFC) based payments and Quick Response (QR) based payments. In NFC based transactions, a NFC-enabled device is capable of establishing wireless communication with another NFC-enable device by being brought into proximity with, without being touched to, the other device (e.g., the ability to tap a mobile device to a checkout terminal and the transaction is complete). In QR based transactions, a two-dimensional barcode, or matrix barcode, contains information about a transaction that can be read (i.e., processed) by a QR-code reading machine. For example, a QR code can be generated by a merchant, and a customer can use a mobile device and scan the QR code to complete the transaction; alternatively, the customer can generate a QR code, and the checkout terminal can scan the QR code to complete the transaction.

With regard to NFC-enabled devices being used in contactless payment methods, NFC-based payments can provide a more secure payment method compared with QR-based payments because NFC-based payments works on Europay, Mastercard and Visa (EMV) technologies, which is a global standard that defines a suite of protocols employing strong cryptograph for the interoperation of EMV-enabled cards with EMV-capable point of sale (POS) terminals and automated teller machines (ATMs) for authenticating transactions.

When a mobile device is used for making payments, either through NFC or QR based payments, all card data (e.g., card number, expiration data, billing address, and other relevant data) is encrypted and stored on the mobile device. A key used to encrypt the card data may be either camouflaged using CA ArcotID technology (found, for example, on www.ca.com), a key derived from a PIN known to the user, or stored in a secure element of the mobile device. In addition, an account unique key (AUKey) used to generated a dynamic card verification value (CVV) is stored either in a secure element of the mobile device, or camouflaged using CA ArcotID technology. In particular, a dynamic CVV is generated based on the AUkey, an unpredictable number, a card number, and an application transaction counter (ATC). The unpredictable number may be provided by the POS, by the issuer (e.g., the issuer of the credit card), or prefetched in a batch. For example, when the unpredictable number is provided by the issuer, the issuer can verify the dynamic CVV against the unpredictable number (which was sent by the issuer itself). The ATC is a counter maintained by a chip card application that provides a sequential reference to each transaction for fraud monitoring purposes. For example, a duplicate ATC, a decrease in ATC, or a large jump in ATC values may indicate data copying or other fraudulent activities on the card. In addition, for security purposes, the counter number is incremented by one, via the ATC, after each transaction, and the incremented counter number is stored in a memory (e.g., a memory 12 of the mobile device 10).

To make a payment, the application 14 needs to store sensitive card data like the Limited Use Key (LUK) and other data such as track 1 and track 2 data. The application 14 receives this card data from the wallet server 26. The application 14 can store more than one card. The LUK and other data are used by the application to generate a dynamic CVV number. This CVV number is sent to the merchant 30 when the user taps the mobile device 10 on the NFC reader (or scans the QR code at the QR code reader) of the merchant 30. This CVV number is then sent to the issuer server 28. The issuer server 28 verifies the CVV and either approves or rejects the payment.

The merchant terminal 30 may be active or passive. If the merchant 30 is active, it is powered by electricity or another power source. If the merchant 30 is passive, it does not require any electricity or power source, but can still communicate with a contactless enabled device by, for example, NFC electromagnetic induction. In addition, the merchant 30 may also be a mobile device, a tablet, a computer system, a smartphone-based system, any other suitable receiving system, or any combination thereof. The payment infrastructure may also include an acquirer system and a payment network.

The LUK can be protected and stored in the mobile device 10. The LUK can also be camouflaged with a PIN of any length or format. The can be at least one LUK for each account, such as, for example, a credit card, associated with the mobile device 10. If there are multiple LUKs, they will all be camouflaged with the same PIN. Thus, because all the cards, and LUKs corresponding to the cards, are camouflaged with the same PIN, the user needs to remember only one PIN. Once the user enters the PIN into the mobile device 10, the user will be able to use any of the cards for payment.

In a typical NFC based payment, the mobile device is capable of connecting to the network (e.g., via the internet) to obtain the unpredictable number from the POS in order to generate a dynamic CVV to complete a transaction. However, in QR based payment methods which typically do not have access to the network, the unpredictable number cannot "travel" from the POS to the mobile device. According to an embodiment of the current disclosure, a cardholder initiates a transaction at a merchant terminal. The transaction can be a NFC transaction, a QR code transaction, or any other suitable type of transaction. The transaction can be contactless and can be initiated via a mobile device 10 such as, for example, a mobile phone. According to an embodiment of the current disclosure, the contactless transaction can be completed while the mobile device 10 is in an offline mode and not connected to the internet.

Figure 1:
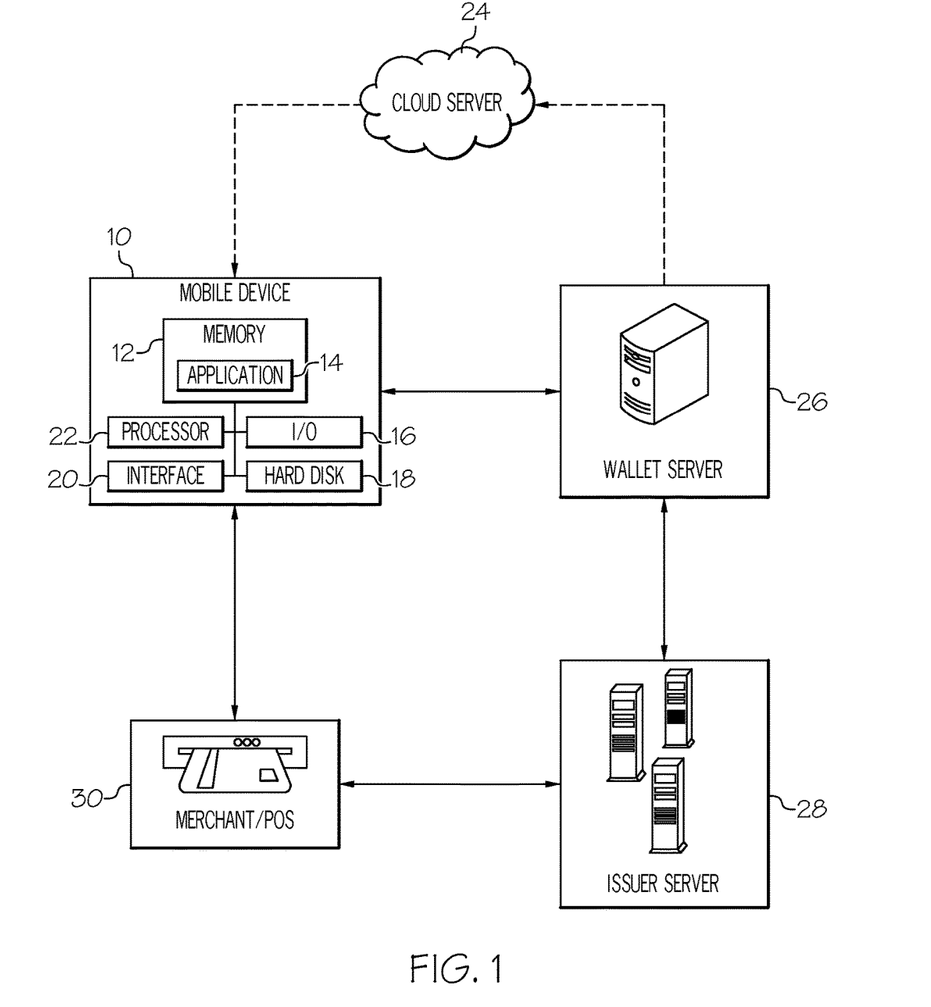
FIG. 1 is a schematic representation of the payment ecosystem in accordance with a non-limiting embodiment of the present disclosure.

FIG. 1 is a schematic representation of the payment ecosystem in accordance with a non-limiting embodiment of the present disclosure. The payment ecosystem can include a mobile device 10, a cloud server 24, a wallet server 26, an issuer server 28, and a merchant/point of sale (POS) 30. Further, the mobile device 10 can include a memory 12, application 14 (also referred to as 'mobile application' herein), input and output ("I/O") device 16, hard disk 18, interface 20, and processor 22. Processor 22 may be operable to load instructions from hard disk 18 into memory 12 and execute those instructions. Memory 12 may store computer-readable instructions that may instruct the mobile device 10 to perform certain processes. I/O device 16 may receive one or more of data from cloud server 24, wallet server 26, merchant/POS 30, and issuer server 28. The merchant/POS 30 may be local, online, or any other suitable configuration. For example, a local merchant terminal is considered in close proximity to a mobile device such that the user can perform a contactless transaction.

Cloud server 24 may comprises one or more entities, which may be public, private, or community based. Each cloud server 24 may permit the exchange of information and services among users/entities that are connected to such cloud server 24. In certain configurations, cloud server 24 may be a local area network, such as an intranet. Further, cloud server 24 may be a closed, private network/cloud, in certain configurations, and an open network/cloud in other configurations. Cloud server 24 may facilitate wired or wireless communications of information and provisioning of services among users that are connected to cloud server 24.

The mobile device 10 can be NFC-enabled via an antenna. The application 14 on the mobile device 10 may act as a control interface for the cardholder during a contactless transaction. The application 14 may be the means with which the cardholder prepares the mobile device 10 for contactless transaction and the means with which the cardholder receives a display of payment confirmation. The application 14 can also be the means with which the cardholder initiates a mobile transaction. According to an embodiment of the current disclosure, the application 14 can be a mobile application installed on the mobile device 10.

Figure 2A:
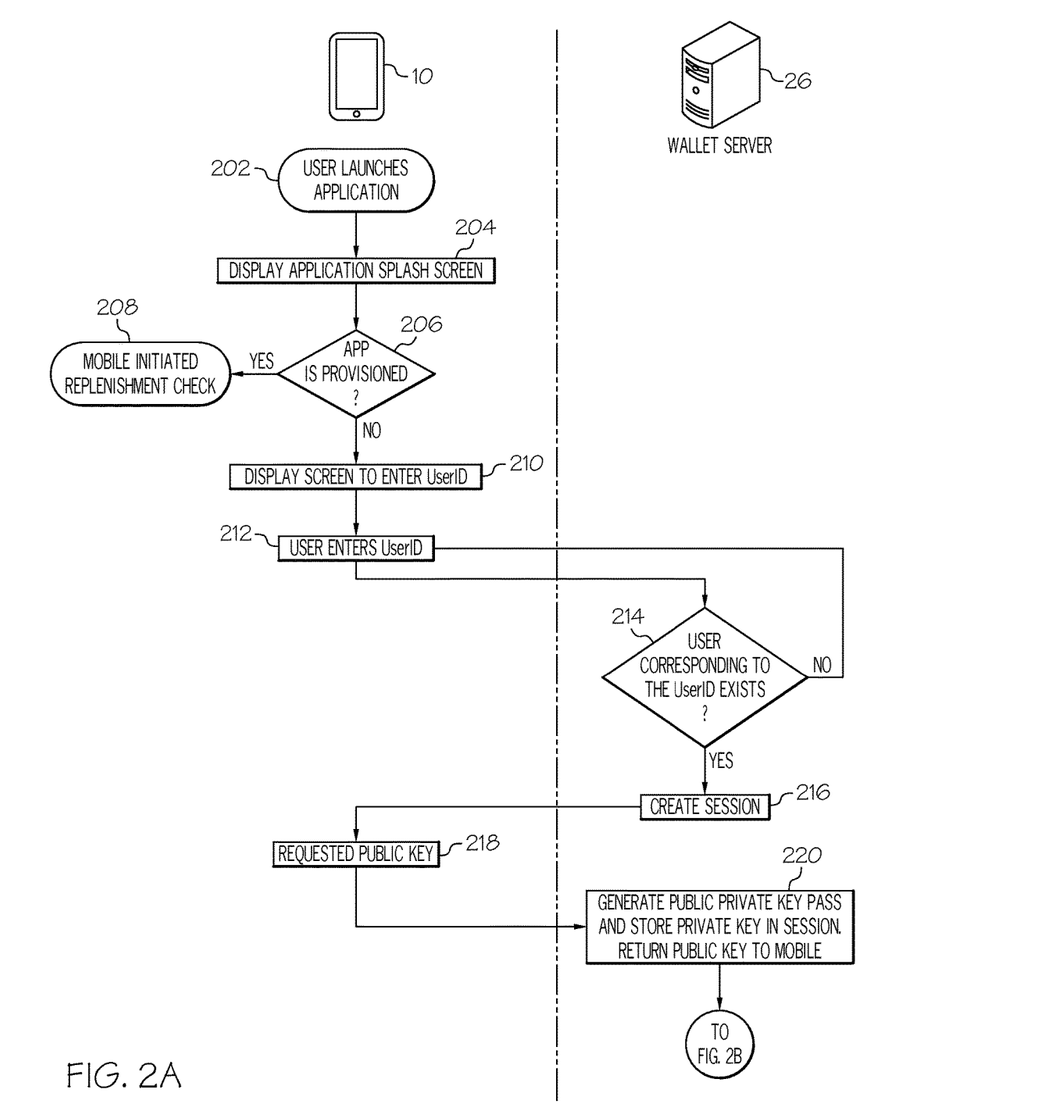
FIG. 2A illustrates a flow diagram depicting a method of authenticating a user during a mobile transaction in accordance with a non-limiting embodiment of the present disclosure.

FIG. 2A illustrates a flow diagram depicting a method of authenticating a user during a mobile transaction in accordance with a non-limiting embodiment of the present disclosure. In step 202, a user can launch the application 14 on the mobile phone 10. Upon launching the application 14, the user's mobile device will display a splash screen, as depicted in step 204. In step 206, the application 14 determines whether it is prepared and provisioned to service the user. If the application 14 is not provisioned, step 210 indicates the application 14 will display a screen for the user to enter a UserID. If the application 14 is provisioned, the application 14 will initiate a replenishment check, as in step 208. The replenishment check can include receiving updated card data from the wallet server 26. Card data can include track 1 or track 2 data, LUKs, sensitive user information, or any data necessary to complete a contactless transaction.

In step 212 the user enters a UserID into the mobile application 14 on the mobile device 10. In step 214, the wallet server 26 checks whether the entered UserID exists. If the UserID exists, the wallet server 26 creates a session, as shown in step 216. The following steps continue the process of the wallet server 26 authenticating the user with the mobile device 10 for mobile payment. In step 218, the mobile application 14 requests a public key. In step 220, the wallet server 26 generates a public key and private key, stores the private key in session, and returns the public key to the mobile device 10.

Figure 2B:
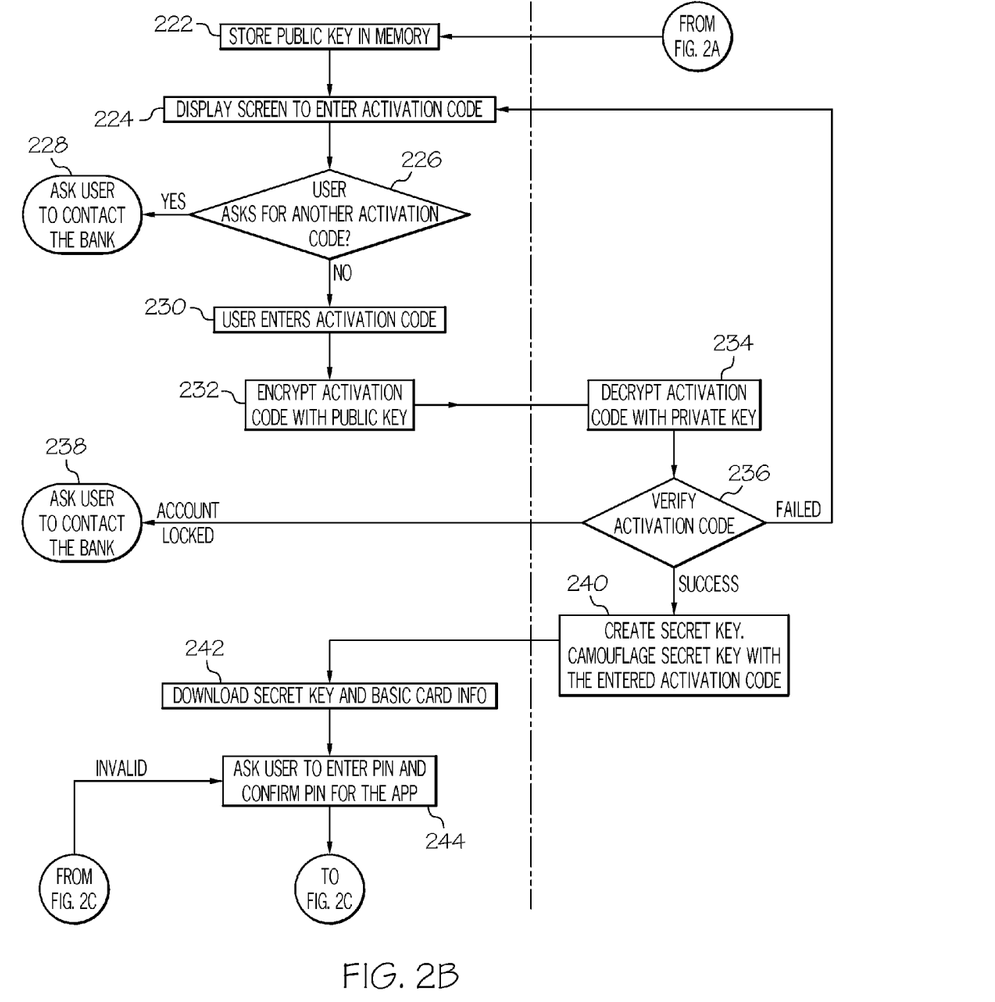
FIG. 2B illustrates a flow diagram, continued from FIG. 2A, of a method of authenticating a user during a mobile transaction in accordance with a non-limiting embodiment of the present disclosure.

Continuing on to step 222 in FIG. 2B, the mobile application 14 stores the public key in memory 12. In step 224, the mobile application 14 displays a screen prompt for the user to enter an activation code. If the user requests another activation code in step 226, the mobile application 14 asks the user to contact the user's bank (step 228). If the user does not request another activation code, the user enters the activation code. Using the public key stored in step 222, the mobile application 14 encrypts the activation code in step 232. In step 234, the wallet server decrypts the activation code with a private key. In step 236, the wallet server 26 verifies the activation code. If the wallet server 26 is unable to verify the activation code, the mobile application 14 redisplays the prompt screen to enter an activation code. The wallet server 26 can also lock the user's account and prompt the mobile application 14 to ask the user to contact the user's bank to acquire another activation code.

Upon verifying the activation code in step 236, the wallet server 26 creates a secret key and camouflages the secret key with the entered activation code in step 240. The secret key may be created using the entered activation code, or in any other suitable manner. The secret key may also be a random character string generated using a random character generator. In step 242, the mobile application 14 downloads the secret key and basic card information from the wallet server 26. The mobile application 14 then prompts the user to enter the PIN and confirm the PIN in step 244.

Figure 2C:
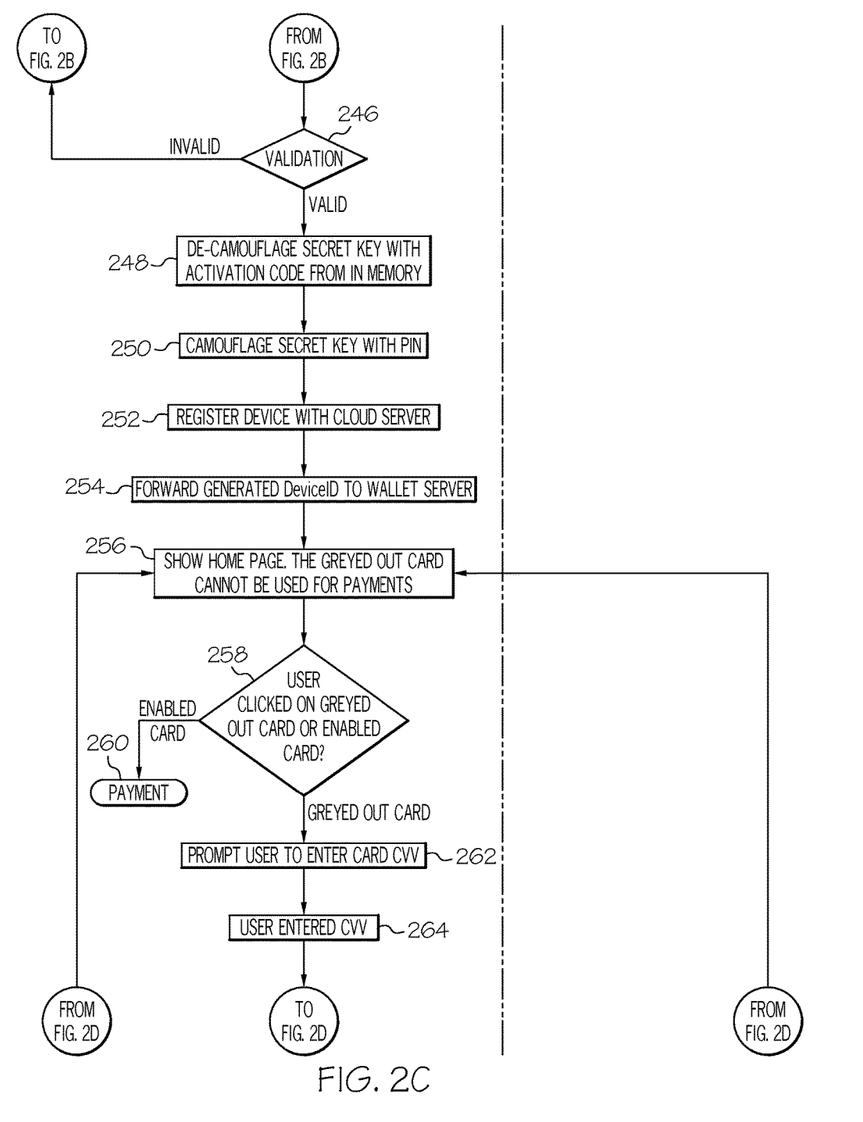
FIG. 2C illustrates a flow diagram, continued from FIG. 2B, of a method of authenticating a user during a mobile transaction in accordance with a non-limiting embodiment of the present disclosure.

Continuing on to step 246 in FIG. 2C, the mobile application 14 validates the PIN if the user has entered the correct PIN. If the user has entered an incorrect PIN, the mobile application 14 will prompt the user to reenter and confirm the PIN. If the user has entered a correct PIN, the mobile application 14 will de-camouflage the secret key with the activation code stored in memory 12 in step 248. In step 250, the mobile application 14 will then camouflage the secret key with the user's PIN. The mobile application 14 may encrypt the secret key using CA technology such as, for example, cryptographic camouflage. In step 252, the mobile application 14 will register the device with the cloud server 24. The mobile application 14 can also register the device with the wallet server 26. In step 254, the mobile application 14 generates and forwards a DeviceID to the wallet server 26.

In step 256, the mobile application 14 displays a home page with optional cards to use for payment. The user can click on either greyed out cards or cards that are not greyed out in step 258. Cards that appear greyed out cannot be used for payment. Cards that are not greyed out are enabled for payment, see step 260. To activate a greyed out card, the user can enter the card's CVV, as shown in steps 262 and 264.

Figure 2D:
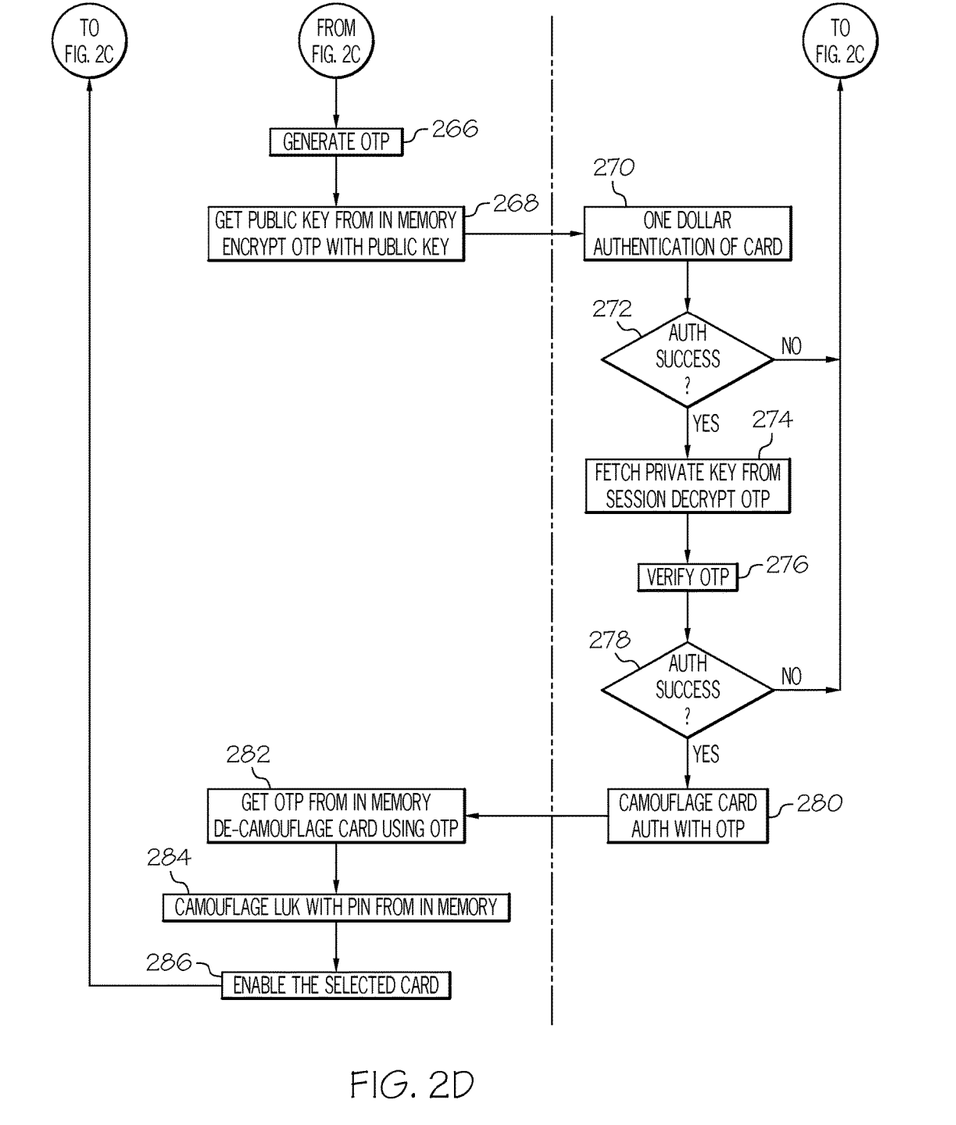
FIG. 2D illustrates a flow diagram, continued from FIG. 2C, of a method of authenticating a user during a mobile transaction in accordance with a non-limiting embodiment of the present disclosure.

Continuing on to step 246 in FIG. 2D, once the user has entered the card's CVV, the mobile application 14 generates a one time password (OTP) in step 266. The mobile application 14 then encrypts the OTP with the public key stored in the memory 12 of the mobile application 14, see step 268. In step 270, the wallet server 26 authenticates the card. As seen in step 272, if the authorization is unsuccessful, the mobile application 14 will show the home page depicting the greyed out and enabled cards. If the authorization is a success, the wallet server 26 will fetch the private key from the session and decrypt the OTP.

The wallet server 26 will then verify the OTP in step 276. As seen in step 278, if the authorization is unsuccessful, the mobile application 14 will show the home page depicting the greyed out and enabled cards. If the authorization is a success, the wallet server 26 will camouflage the card authorization data (including LUKs) with the OTP and send it to the mobile application 14.

In step 282, the mobile application 14 will retrieve the OTP from memory 12 and de-camouflage the card authorization data. In step 284, the mobile application 14 will camouflage the LUK (received with the card authorization data) with a PIN from memory 12. In step 286, the mobile application 14 will enable the selected card.

Figure 3A:
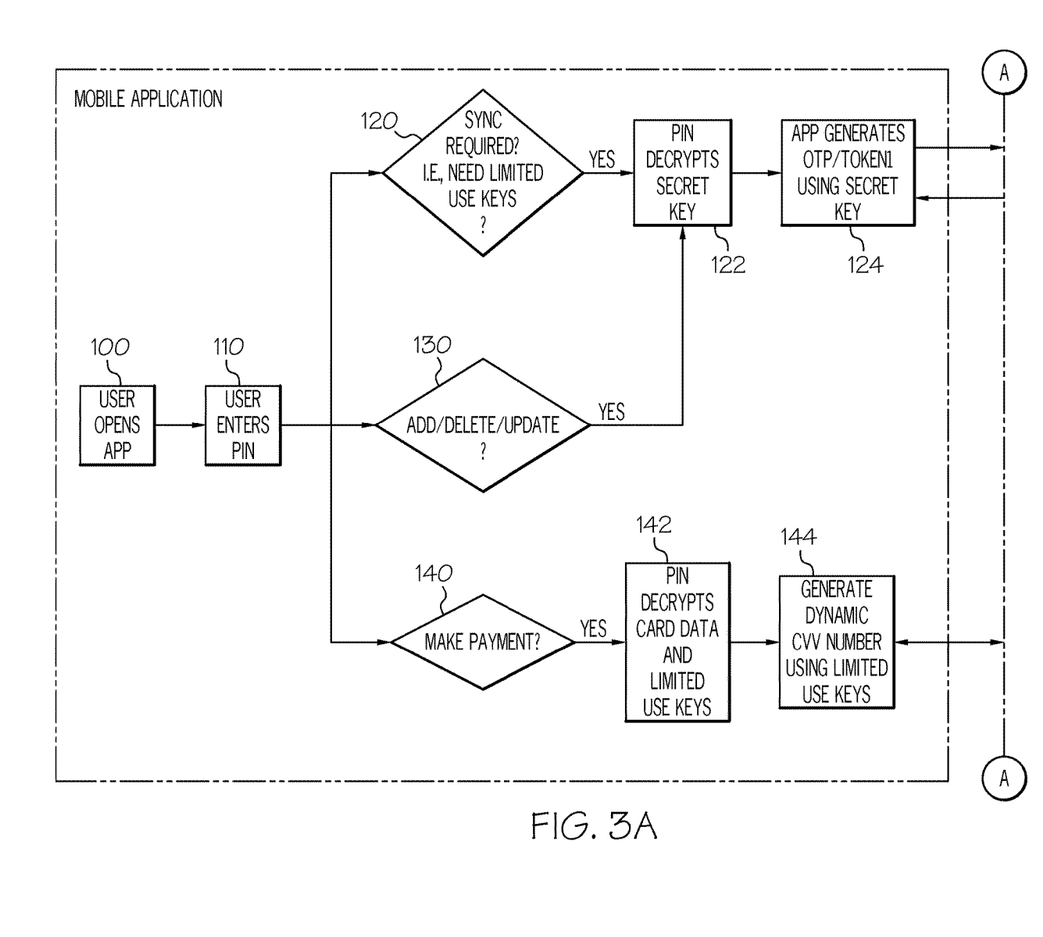
FIG. 3A illustrates a diagram of mobile application logic during a mobile transaction in accordance with a non-limiting embodiment of the present disclosure.
Figure 3B:
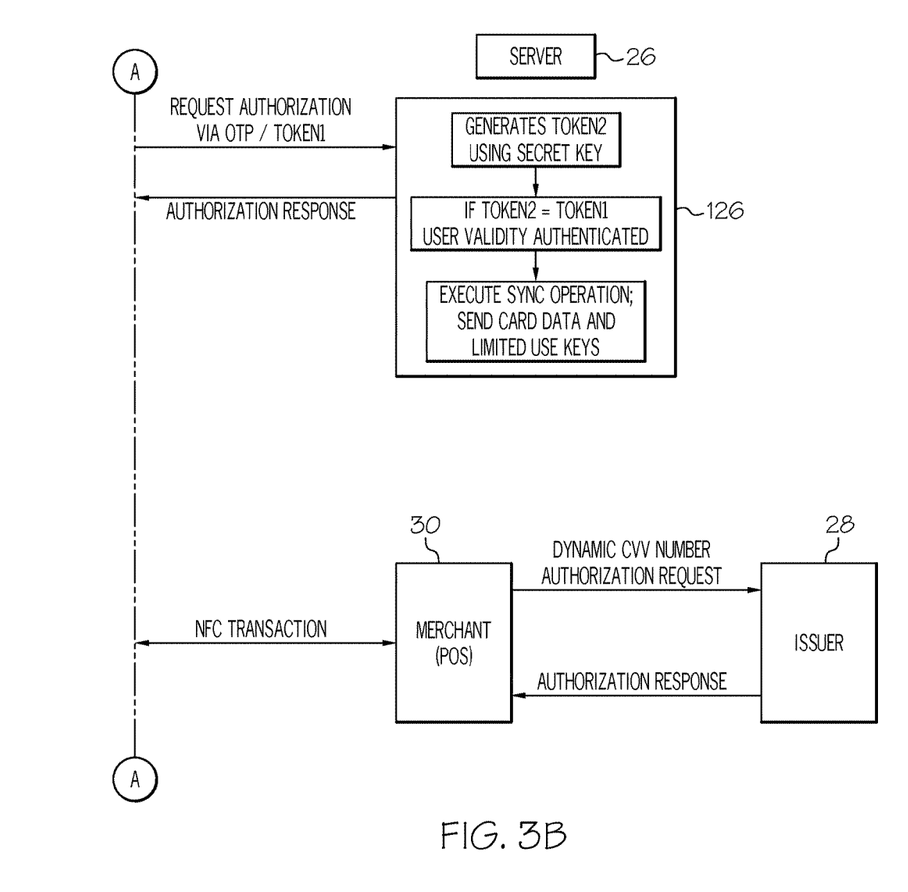
FIG. 3B illustrates a diagram, continued from FIG. 3A, displaying the interaction between the mobile application in FIG. 3A and the server, merchant, and issuer systems in accordance with a non-limiting embodiment of the present disclosure.

FIG. 3A and FIG. 3B depict a user enabling the mobile application 14 to complete a mobile transaction.

Beginning with FIG. 3A, the user opens the mobile application 14 on the mobile device 10 (step 100). In step 110, the user enters a user-defined PIN. The mobile application 14 can do the following steps as a background process, i.e., transparent to the user. In step 120, the mobile application determines if a sync with the wallet server 26 is required in order to update card authentication data such as LUKs. For example, the LUKs may time out. In step 130, the mobile application 14 determines whether to sync with the wallet server 26 to add new cards, delete cards, or update cards. If the mobile application 14 determines that either step 120 or 130 is necessary, the mobile application 14 decrypts the secret key using the user's PIN. The mobile application 14 then generates an OTP/Token1 using the secret key in step 124. The OTP can be generated by CA ArcotOTP generator. The OTP can also be a product of an algorithm requiring several factors shared between the mobile application 14 and the wallet server 26. These factors can include time, an algorithm function, and the secret key decrypted by the PIN.

Continuing to FIG. 3B, the mobile application 14 requests authorization via OTP/Token1 from the wallet server 26. By having the OTP/Token1 travel over the internet to the wallet server 26, the PIN itself does not have to travel over the internet. Furthermore, the PIN is not stored anywhere in the system as only the user knows the PIN. To authorize a sync operation 126, the wallet server 26 generates a OTP/Token2 using the secret key and the same factors available to the mobile application 14. If OTP/Token1 is identical to OTP/Token2, user validity is authenticated and the wallet server 26 will execute the sync operation 126. During execution, the wallet server 26 sends card authorization data and LUKs to the mobile application 14. The card authorization data and LUKs give the user the ability to make a payment.

In order to generate an authorization request via OTP/Token1, the mobile application 14 may have additional security measures such as, for example, scanning a fingerprint, entering a passcode, a secure element authorization, or any other appropriate security measure. The secure element can be a chip in a mobile device 10 or function virtually in the cloud server 24.

Returning to FIG. 3A, should the user decide to make a payment (step 140), the mobile application 14 uses the PIN to decrypt card data and LUKs (step 142). Next, in step 144, the mobile application 14 generates a dynamic CVV using the LUKs.

Turning to FIG. 3B, the user interacts with a merchant 30 when the user makes a transaction, such as, for example, an NFC transaction. The merchant 30 then sends an authorization request containing the dynamic CVV to an issuer 28. The issuer 28 will determine whether or not to authorize the transaction and send an authorization response back to the merchant 30.

The authorization request containing the dynamic CVV can be in the form of a cryptogram. The cryptogram can be in the form of a one-time password generated by Arcot OTP technology of CA Technologies. The issuer system 28 can also decrypt the cryptogram using Arcot OTP technology in order to determine a transaction status. Furthermore, the authorization request and response as shown in FIG. 3B may be in the form of a cryptogram or coded communication. Additionally, the authorization request and response may also be in the form of short message service ("SMS"), email, or any other suitable type of communication.

The flowchart depicted in FIGS. 2A-3B illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in transactions with a merchant terminal, but rather that embodiments of the invention may be used in any transaction having a need to receive confirmation notification of any type. The specification and the described examples are considered as exemplary only, with the true scope and spirit of the invention indicated by the following claims.

What is claimed is:

1. A method, comprising:
   sending an activation code stored on a mobile device to a server for verification;
   receiving an encrypted secret key generated by the server using the activation code;
   decrypting the secret key using the activation code stored on the mobile device;
   encrypting the secret key using a predetermined PIN;
   receiving the predetermined PIN from a user;
   confirming that the predetermined PIN received from the user is correct by comparing the predetermined PIN received from the user with a user-defined PIN stored on the mobile device;
   in response to receiving the predetermined PIN and confirming that the predetermined PIN received from the user is correct, determining whether a synchronization between the server and the mobile device is required:
   in response to determining that a synchronization between the server and the mobile device is required, decrypting the secret key;
   generating, via the mobile device, a first token using the secret key;
   transmitting the first token to the server to authenticate the user;
   receiving authentication from the server; and
   syncing information on the mobile device with the server; and
   in response to receiving the predetermined PIN:
     generating a dynamic card verification value; and
     transmitting the dynamic card verification value to an issuer for authentication during a transaction.

2. The method of claim 1, wherein the dynamic card verification value is generated using a limited use key.

3. The method of claim 1, wherein the first token is a one-time password generated using the secret key.

4. The method of claim 1, wherein the server authenticates the user by generating a second token identical to the first token.

5. The method of claim 1, wherein determining whether a synchronization between the server and the mobile device is required comprises determining whether a synchronization is required to update card authentication data.

6. The method of claim 1, wherein the encryption step is completed using cryptographic camouflage.

7. The method of claim 5, wherein the card authentication data required to be updated comprises a limited use key.

8. A mobile device, comprising:
a processor; and
a non-transitory, computer-readable storage medium storing computer-readable instructions that when executed by the processor cause the mobile device to perform:
sending an activation code stored on the mobile device to a server for verification;
receiving an encrypted secret key generated by the server using the activation code;
decrypting the secret key using the activation code stored on the mobile device;
encrypting the secret key using a predetermined PIN;
receiving the predetermined PIN from a user;
confirming that the predetermined PIN received from the user is correct by comparing the predetermined PIN received from the user with a user-defined PIN stored on the mobile device;
in response to receiving the predetermined PIN and determining that the predetermined PIN received from the user is correct, determining whether a synchronization between the server and the mobile device is required;
in response to determining that a synchronization between the server and the mobile device is required:
decrypting the secret key;
generating, via the mobile device, a first token using the secret key;
transmitting the first token to the server to authenticate the user;
receiving authentication from the server; and
syncing information on the mobile device with the server; and
in response to receiving the predetermined PIN:
generating a dynamic card verification value; and
transmitting the dynamic card verification value to an issuer for authentication during a transaction.

9. The mobile device of claim 8, wherein the dynamic card verification value is generated using a limited use key.

10. The mobile device of claim 8, wherein the first token is a one-time password generated using the secret key.

11. The mobile device of claim 8, wherein the server authenticates the user by generating a second token identical to the first token.

12. The mobile device of claim 8, wherein the user-defined PIN stored on the mobile device remains stored on the mobile device and is not shared with the server.

13. The mobile device of claim 8, wherein the encryption step is completed using cryptographic camouflage.

14. The mobile device of claim 8, wherein syncing information comprises receiving a limited use key.

15. A computer program product comprising:
a non-transitory computer-readable storage medium having computer-readable program code embodied therewith, the computer-readable program code comprising:
computer-readable program code configured to send an activation code stored on a mobile device to a server for verification;
computer-readable program code configured to receive an encrypted secret key generated by the server using the activation code;
computer-readable program code configured to decrypt the secret key using the activation code stored on the mobile device;
computer-readable program code configured to encrypt the secret key using a predetermined PIN;
computer-readable program code configured to receive the predetermined PIN from a user;
computer-readable program code configured to confirm that the predetermined PIN received from the user is correct by comparing the predetermined PIN received from the user with a user-defined PIN stored on the mobile device;
computer-readable program code configured to, in response to receiving the predetermined PIN and confirming that the predetermined PIN received from the user is correct, determining whether a synchronization between the server and the mobile device is required;
computer-readable program code configured to, in response to determining that a synchronization between the server and the mobile device is required:
decrypt the secret key;
generate, via the mobile device, a first token using the secret key;
transmit the first token to the server to authenticate the user;
receive authentication from the server; and
sync information on the mobile device with the server;
computer-readable program code configured to, in response to receiving the predetermined PIN:
generate a dynamic card verification value; and
transmit the dynamic card verification value to an issuer for authentication during a transaction.

16. The computer program product of claim 15, wherein the dynamic card verification value is generated using a limited use key.

17. The computer program product of claim 15, wherein the first token is a one-time password generated using the secret key.

18. The computer program product of claim 15, wherein the server authenticates the user by generating a second token identical to the first token.

19. The computer program product of claim 15, wherein the secret key is encrypted using cryptographic camouflage.

20. The computer program product of claim 15, wherein the computer-readable program code configured to sync information further comprises:
computer-readable program code configured to receive a limited use key.

* * * * *